United States Patent [19]

Langenfeld et al.

[11] Patent Number: 4,887,939
[45] Date of Patent: Dec. 19, 1989

[54] EXTENSION ARM ASSEMBLY FOR A TRACTOR LOADER

[75] Inventors: Joseph W. Langenfeld; Neal W. Westendorf, both of Onawa, Iowa

[73] Assignee: Westendorf Mfg. Co., Inc., Onawa, Iowa

[21] Appl. No.: 264,839

[22] Filed: Oct. 31, 1988

[51] Int. Cl.4 ............................................. B66C 23/00
[52] U.S. Cl. .................................... 414/722; 414/723; 414/727
[58] Field of Search ............... 414/722, 723, 718, 685, 414/686, 727

[56] References Cited

U.S. PATENT DOCUMENTS

| | | | |
|---|---|---|---|
| 3,251,491 | 5/1966 | French et al. | 414/718 |
| 4,571,146 | 2/1986 | Eriksson | 414/723 X |
| 4,798,511 | 1/1989 | Kaczmarczyk et al. | 414/686 |
| 4,808,061 | 2/1989 | Cook et al. | 414/723 X |

FOREIGN PATENT DOCUMENTS 3532092 4/1987 Fed. Rep. of Germany ...... 414/722

Primary Examiner—Robert J. Spar
Assistant Examiner—James T. Eller
Attorney, Agent, or Firm—Zarley, McKee, Thomte, Voorhees & Sease

[57] ABSTRACT

An extension arm assembly for mounting on the forward ends of the boom arms of a tractor loader is described which enables the effective length of the boom arms to be extended thereby enabling the tractor loader to raise materials to a height greater than that otherwise possible. The extension arm assembly may be quickly and easily mounted on the forward ends of the boom arms without modification thereof.

1 Claim, 4 Drawing Sheets

4,887,939

EXTENSION ARM ASSEMBLY FOR A TRACTOR LOADER

BACKGROUND OF THE INVENTION

Tractor loaders or front-end loaders such as described in U.S. Pat. No. 4,051,962 include a frame means which is mounted on the tractor and which has a pair of boom arms pivotally mounted on towers on the frame means. Hydraulic cylinders are operatively connected to and extend between the frame means and the boom arms for raising and lowering the boom arms relative to the frame means and the tractor. Some form of materials handling attachment such as a hay spike, grapple hook, bucket, etc. is normally pivotally mounted on the forward ends of the boom arms and are pivoted with respect thereto by a pair of hydraulic cylinders. The vertical height to which the attachment may be raised is limited by the length of the boom arms, the hydraulic cylinders connected thereto which raise and lower the boom arms, and the height of the towers. The height limitation of the conventional front-end loaders sometimes prevents the loader from being used to stack hay bales or the like.

The height limitation of the conventional front-end loaders may be easily overcome by simply lengthening the boom arms but the increase in the length of the boom arms seriously detracts from the compactness and maneuverability of the tractor loader since greater boom arms length is not always required and it is sometimes desirable to have a tractor loader which has relatively short arms and/or a low profile.

It is therefore a principal object of the invention to provide an improved tractor loader.

A further object of the invention is to provide an improved tractor loader having an extension arm assembly removably mounted thereon which enables the materials handling attachment thereon to be raised to a greater height than that possible with the conventional loader.

Yet another object of the invention is to provide an improved tractor loader having an extension arm assembly which is quickly and easily mounted on the ends of the boom arms without modification thereof.

Still another object of the invention is to provide a tractor loader having an extension arm assembly which enables a materials handling attachment such as a bucket to be "rolled" back.

Still another object of the invention is to provide a tractor loader of the type described which is economical of manufacture, durable in use and refined in appearance. These and other objects will be apparent to those skilled in the art.

SUMMARY OF THE INVENTION

Figure 1:
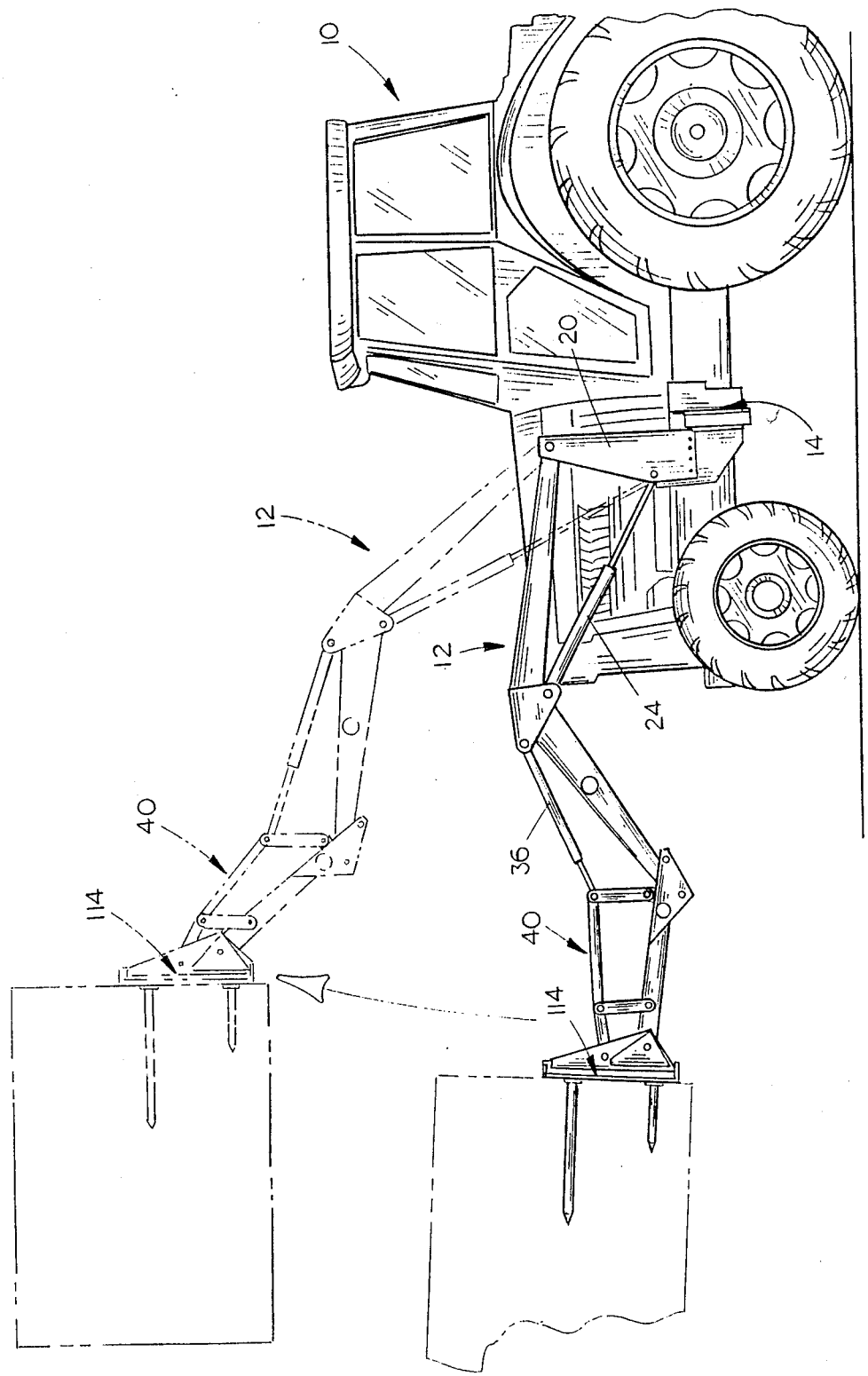
FIG. 1 is a side view illustrating the extension arm assembly of this invention mounted on a tractor loader.

A tractor loader is described which includes an extension arm assembly quickly and easily removably mounted on the forward ends of the boom arms thereof so that the materials handling attachment mounted thereon may be raised to a position above that which is normally possible. The extension arm assembly is mounted on the forward ends of the boom arms and extends forwardly therefrom at an angle with respect thereto. The materials handling attachment is operatively secured to the forward end of the extension arm assembly with the extension arm assembly enabling the materials handling attachment to be raised to a height greater than that possible with the conventional loader.

DESCRIPTION OF THE PREFERRED EMBODIMENT

Referring to the drawings, the numeral 10 refers to a tractor having a conventional front end loader 12 mounted thereon. Although loaders of the type shown are generally mounted on the forward end of the tractor, loaders are sometimes mounted on the rearward end of the tractor. Further, the loader could be mounted on any wheeled vehicle having a vertical movable boom means. However, the preferred embodiment of the invention contemplates that the loader be mounted on the forward or front end of the tractor.

Loader 12 includes a frame means 14 having a pair of boom arms 16 and 18 which are pivotally mounted at their rearward ends to towers 20 and 22 (not shown) respectively. A pair of hydraulic cylinders 24 and 26 (not shown) are provided for raising and lowering the boom arms 16 and 18 relative to frame means 14 and tractor 10 and extend between towers 20, 22 and boom arms 16, 18 respectively.

Boom arms 16 and 18 are provided with a tube or sleeve 28 and 30 at the forward ends thereof which are adapted to receive a pin or the like so that a materials handling attachment or a quick attach assembly may be pivotally mounted thereto. Further, the boom arms 16 and 18 are provided with sleeves or pivot tubes 32 and 34 secured to the rearward sides thereof rearwardly of the forward ends thereof which normally receive pivot pins which connect a suitable linkage means to the materials handling attachment or the quick attach means. A pair of hydraulic cylinders 36 and 38 are pivotally secured at their base ends to boom arms 16 and 18 as seen in the drawings. Normally, the forward ends of the hydraulic cylinders 36 and 38 would be pivotally connected to either the linkage means previously described, the materials handling attachment or to the quick attach means.

To enable the boom arms 16 and 18 to be effectively lengthened, the quick attach means, materials handling attachment and pivot linkage is removed therefrom so that the extension arm assembly 40 may be mounted on the boom arms 16 and 18. Extension arm assembly 40 includes pair of extension arms 42 and 44 which are secured to the forward ends of boom arms 16 and 18 respectively and which extend forwardly therefrom at an angle thereto as seen in the drawings. As seen in the drawings, a pair of spaced-apart plates 46 and 48 are provided at the rearward end of arm 42 and a pair of plates 50 and 52 are provided at the rearward end of arm 44. Plates 46, 48, 50 and 52 have openings 54, 56, 58 and 60 formed in the rearward end thereof respectively.

Figure 2:
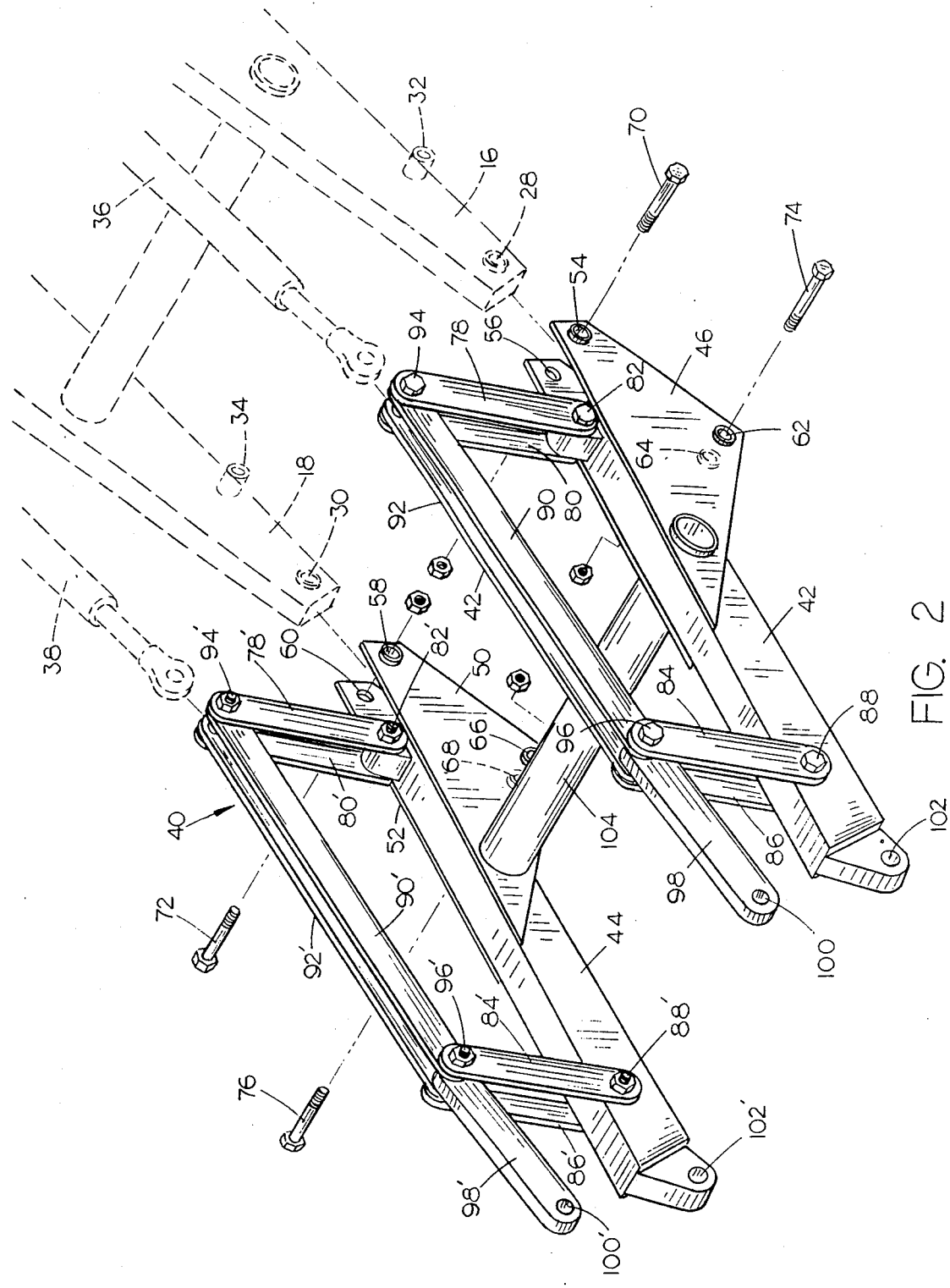
FIG. 2 is a front perspective view of the extension arm assembly of this invention.
Figure 3:
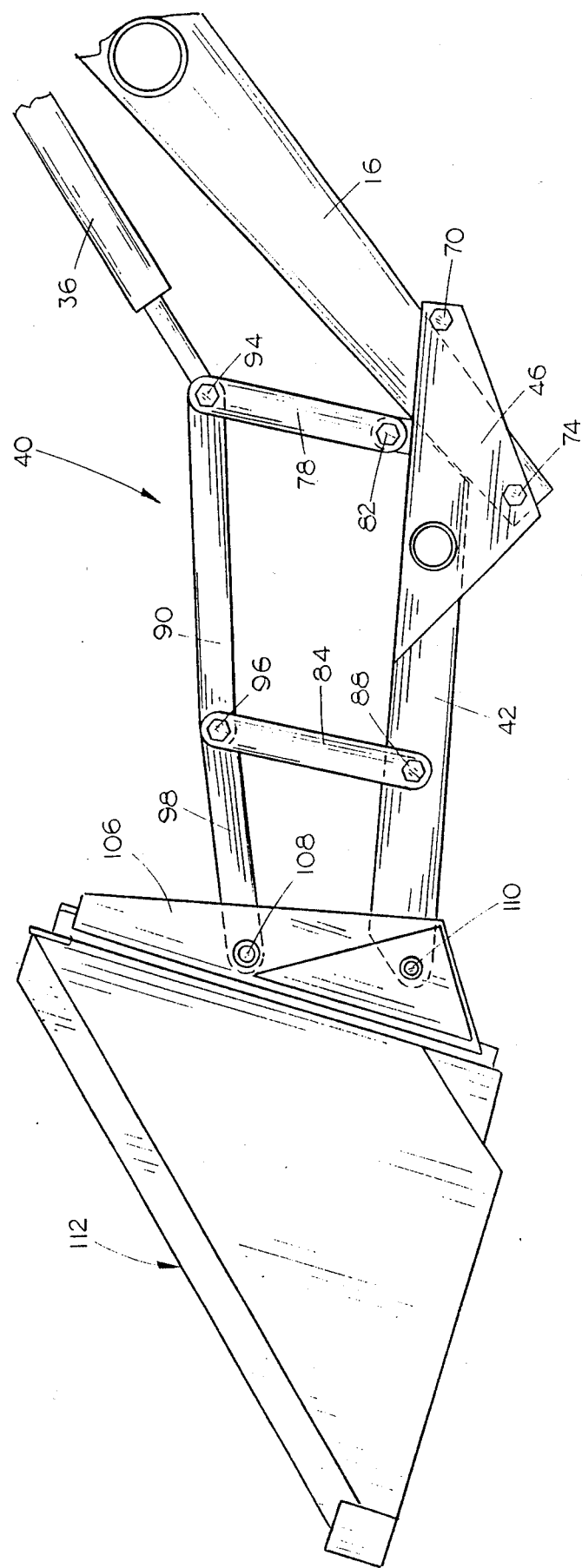
FIG. 3 is a side elevational view of the extension arm of this assembly.

Plates 46, 48, 50 and 52 also have openings 62, 64, 66 and 68 formed therein respectively as seen in FIG. 2.

Bolt 70 extends through opening 54, tube 32 and opening 56 while bolt 72 extends through opening 60, tube 34 and opening 58. Bolt 74 extends through opening 62, tube 28 and opening 64 while bolt 76 extends through opening 68, tube 30 and opening 66.

In some cases, the pivot tubes 32 and 34 are not utilized on the boom arms. In such an arrangement, the rearward ends of plates 46–48 and 50–52 are secured to the boom arms 16–18 respectively by extending bolts through the openings 54–56 and 58–60 and clamping the bolts to the boom arms 16–18. Any convenient means may be employed to secure the plates 46–48 and 50–52 to the boom arms 16–18 respectively.

Upstanding members or posts 78 and 80 are pivotally secured at their lower ends, by bolt 82, to extension arm 42 and extend upwardly therefrom. Posts 84 and 86 are pivoted at their lower ends to extension arm 42 by bolt 88, adjacent the forward end thereof and also extend upwardly therefrom. Linkage members 90 and 92 are pivotally connected to the upper ends of the posts 78 and 80 by bolt 94 and are pivotally connected to the upper ends of posts 84 and 86 by bolt 96. Link 98 is pivoted to the upper ends of posts 84 and 86 by the bolt 96 and extends forwardly therefrom. As seen in the drawings, link 98 is provided with opening 100 in the forward end thereof while arm 42 is provided with opening 102 in the forward end thereof.

Upstanding posts 78' and 80' pivotally secured at their lower ends by bolt 82', to extension arm 44 and extend upwardly therefrom. Posts 84' and 86' are pivoted at their lower ends to extension arm 44 by bolt 88', adjacent the forward end thereof and also extend upwardly therefrom. Linkage members 90' and 92' are pivotally connected to the upper ends of posts 78' and 80' by bolt 94' and are pivotally connected to the upper ends of posts 84' and 86' by bolt 96'. Link 98' is pivoted to the upper ends of posts 84' and 86' by the bolt 96' and extends forwardly therefrom. As seen in the drawings, link 98' is provided with opening 100' in the forward end thereof while arm 44 is provided with opening 102' in the forward end thereof. As seen in FIG. 2, a tubular brace 104 is secured to and extends between the extension arms 42 and 44. Brace 104 may be length adjustably secured to arms 42 and 44 if desired to permit the apparatus to be mounted on various loader models.

Preferably, a quick attach assembly 106 and 106', (not shown) are pivotally secured to the forward ends of the extension arms 42, 44 and links 98 and 98'. For purposes of conciseness, only quick attach assembly 106 will be described. Quick attach assembly 106 is pivoted to the forward end of link 98 by a pin or bolt 108 extending through the quick attach assembly 106 and opening 100 in link 98. Quick attach assembly 106 is also pivoted to the forward end of arm 42 by means of bolt or pin 110 extending through the quick attach assembly 106 and opening 102. The quick attach assembly is of the type described in U.S. Pat. No. 4,085,856 to enable various attachments such as a bucket 112, hay fork 114 or other materials handling attachments to be quickly and easily mounted on the loader.

In some loader models, the pairs of posts 84–86 and 78–80 are not utilized with only a single upstanding post being secured to the extension arm 42 and to the extension arm 44. In those models, an arm similar to arm 98 (98') would be pivotally connected to the upstanding post and to the bucket or quick attach means.

Figure 4:
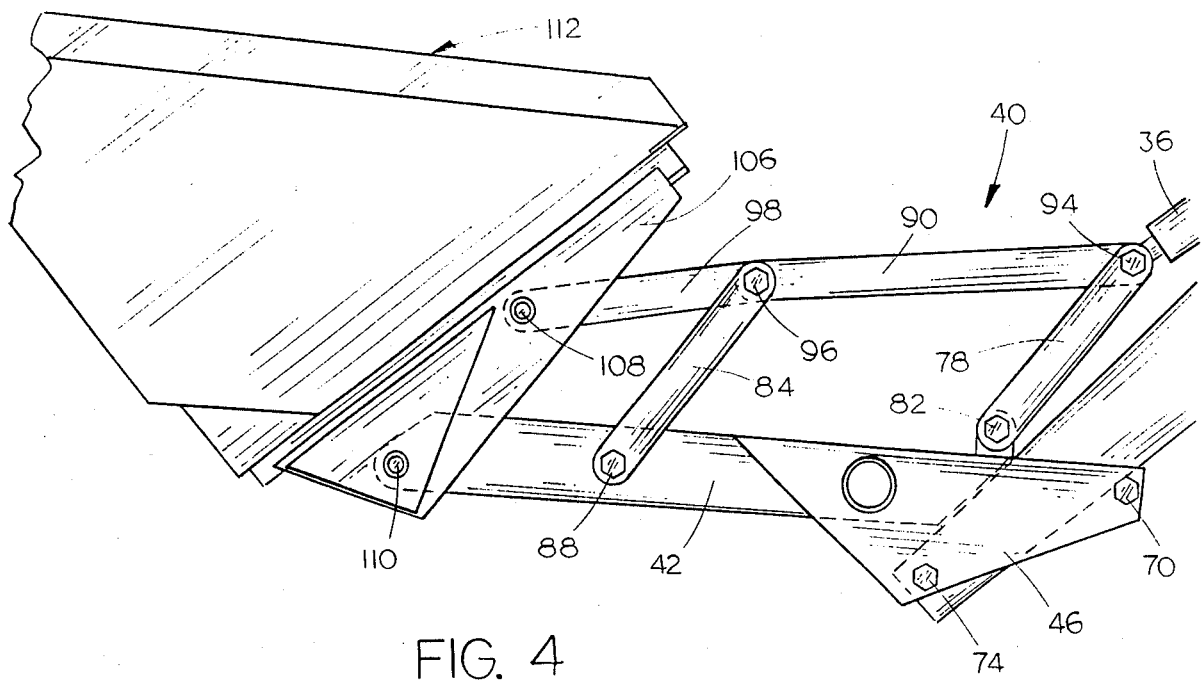
FIG. 4 is a view similar to FIG. 3 except that the bucket mounted on the extension arm assembly has been rolled back.
Figure 5:
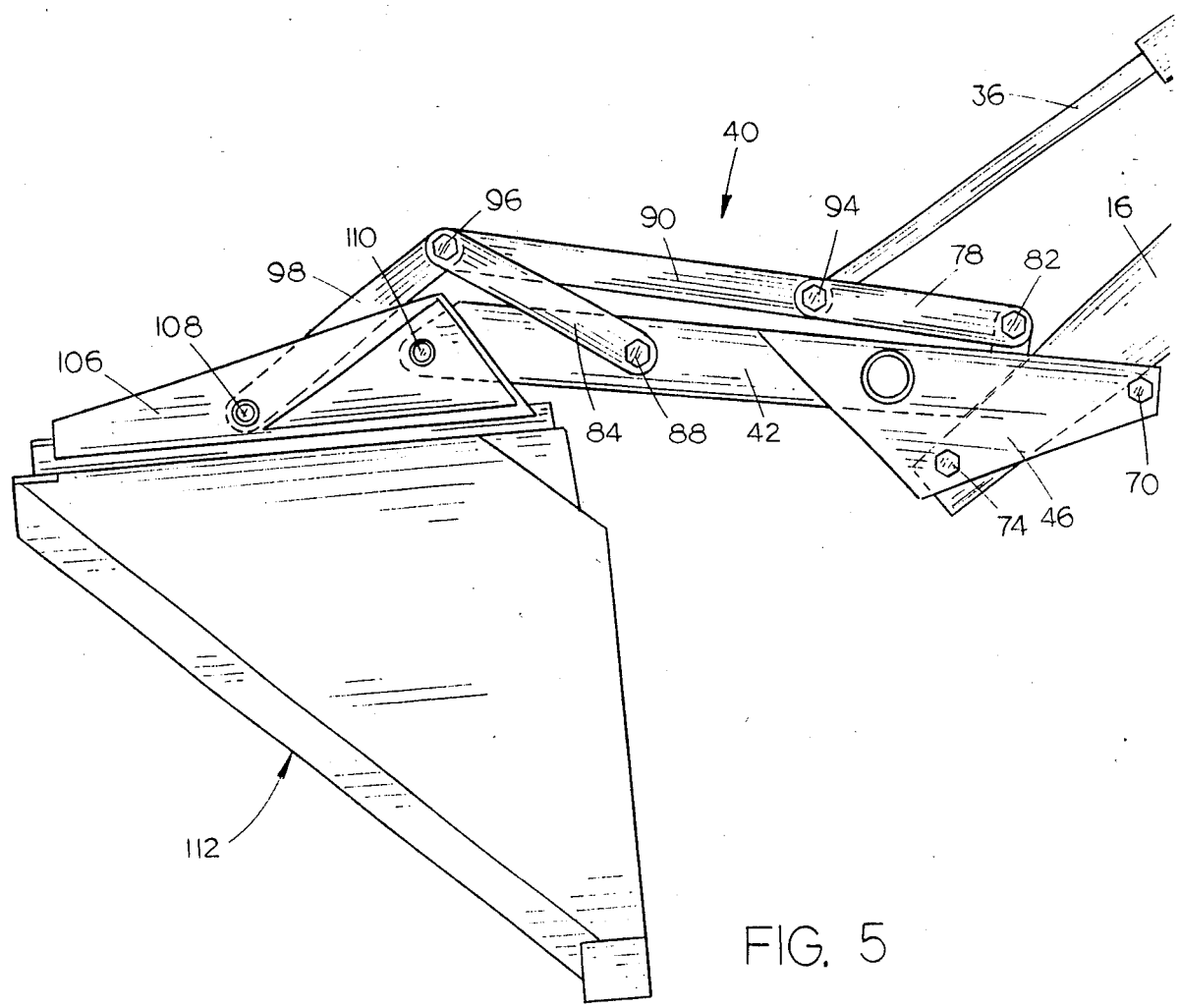
FIG. 5 is a view similar to FIG. 4 except that the bucket has been moved to a dumping position.

To convert a conventional loader to one in which the extension arm of this assembly may be mounted, the hydraulic cylinders 36 and 38 are disconnected from the materials handling attachment mounted on the loader or the quick attach assembly mounted on the loader. The materials handling attachment mounted on the loader is removed from the forward ends of the boom arms or if a quick attach assembly is utilized, the quick attach assembly is removed. The extension arm assembly 40 of this invention is then mounted on the forward ends of the boom arms 16 and 18 as described. The forward ends of hydraulic cylinders 36 and 38' are then pivotally secured to the bolts 94 and 94' respectively. Thus, with the extension arm assembly 40 mounted on the forward ends of the boom arms 16 and 18, the effective length of the boom arms is considerably greater to enable the materials handling attachment mounted on the extension arm assembly 40 to be raised to a greater height than that which was otherwise possible. The quick attach assembly and/or the materials handling attachment may be pivoted relative to the extension arm assembly by manipulating the hydraulic cylinders 36 and 38 as illustrated in the drawings. The arrangement of the upstanding posts and the linkage members and links of the extension arm assembly are such that if a bucket 112 is mounted on the assembly, the bucket may be rolled back as illustrated in FIG. 4. FIG. 5 illustrates the fact that the extension arm assembly configuration is such that the material within the bucket 112 may be dropped or dumped directly therefrom.

Thus it can be seen that a novel extension arm assembly has been provided for a conventional tractor loader so that the tractor loader may be used to raise materials to a greater height than that which is normally possible. Further, the extension arm assembly of this invention is easily mounted on the tractor loader therefrom without any modification of the tractor loader. It can therefore be seen that the invention accomplishes at least all of the stated objectives.

We claim:
1. In combination,
a tractor,
a front loader mounted on said tractor,
said loader including a loader frame means, first and second boom arms pivotally mounted on said loader frame means and extending forwardly of said tractor, and means for pivotally raising and lowering said boom arms relative to said loader frame means and said tractor,
first and second elongated extension arms removably secured to the forward ends of said first and second boom arms respectively and extending forwardly therefrom, said extension arms having rearward and forward ends and upper and lower sides,
a first upstanding post means pivotally secured at its lower end to the upper side of said first extension arm and extending upwardly therefrom adjacent the rearward end thereof and pivotable forwardly to a position parallel and adjacent said first extension arm and pivotable rearwardly to a position parallel and adjacent said first boom arm,
a second upstanding post means pivotally secured at its lower end to said first extension arm and extending upwardly therefrom forwardly of said first upstanding post means,
a first elongated linkage member pivotally secured at one end to the upper end of first upstanding post means and pivotally secured at its other end to the upper end of said second upstanding post means, a third upstanding post means pivotally secured at its lower end to the upper side of said second extension arm and extending upwardly therefrom adjacent the rearward end thereof and pivotable forwardly to a position parallel and adjacent said second extension arm and pivotable rearwardly to a position parallel and adjacent said second boom arm, a fourth upstanding post means pivotally secured at its lower end to said second extension arm and extending upwardly therefrom forwardly of said third upstanding post means, a second elongated linkage member pivotally secured at one end to the upper end of said third upstanding post means and pivotally secured at its other end to the upper end of said fourth upstanding post means, a third elongated linkage member pivotally secured at one end to said second upstanding post means and extending forwardly therefrom, a fourth elongated linkage member pivotally secured at one end to said fourth upstanding post means and extending forwardly therefrom, and a materials handling attachment operatively pivotally secured to the forward ends of said first and second extension arms and the forward ends of said third and fourth linkage members, a first hydraulic cylinder operatively pivotally connected at one end to said first boom arm and operatively pivotally secured at its other end to said first upstanding post means, and a second hydraulic cylinder operatively pivotally secured at one end to said second boom arm and operatively pivotally connected at its other end to said third upstanding post means.

* * * * *